United States Patent
Takata et al.

(10) Patent No.: US 8,837,023 B2
(45) Date of Patent: Sep. 16, 2014

(54) PRINTING APPARATUS, COMPOSITE IMAGE DATA GENERATING APPARATUS, AND COMPOSITE IMAGE DATA GENERATING PROGRAM

(75) Inventors: Masayuki Takata, Nagoya (JP); Kazuma Goto, Nagoya (JP); Atsushi Nakamura, Nagoya (JP); Narumi Kawai, Nagoya (JP); Yuichi Ito, Mie-ken (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 477 days.

(21) Appl. No.: 12/729,402

(22) Filed: Mar. 23, 2010

(65) Prior Publication Data

US 2011/0029901 A1  Feb. 3, 2011

(30) Foreign Application Priority Data

Jul. 31, 2009  (JP) .................................. 2009-178846

(51) Int. Cl.
*H04N 1/46* (2006.01)
*G06F 3/033* (2013.01)
*H04N 1/387* (2006.01)
*G06T 11/60* (2006.01)

(52) U.S. Cl.
CPC .............. *H04N 1/3876* (2013.01); *G06T 11/60* (2013.01)
USPC ............ 358/538; 358/537; 358/540; 345/179

(58) Field of Classification Search
USPC ............ 358/537–540; 345/179; 715/801–803
See application file for complete search history.

(56) References Cited

U.S. PATENT DOCUMENTS

| 4,667,248 | A | * | 5/1987 | Kanno .......................... 358/452 |
| 5,191,441 | A | * | 3/1993 | Suzuki et al. ................. 358/451 |
| 5,231,518 | A | * | 7/1993 | Itoh et al. ..................... 358/3.13 |
| 5,249,263 | A | * | 9/1993 | Yanker ......................... 345/594 |

(Continued)

FOREIGN PATENT DOCUMENTS

| JP | H08161522 A | 6/1996 |
| JP | 2002269550 A | 9/2002 |

(Continued)

OTHER PUBLICATIONS

Japanese Official Action dated Mar. 12, 2013 from related application JP 2009-178846 together with an English language translation.

*Primary Examiner* — Madelein A Nguyen
(74) *Attorney, Agent, or Firm* — Scully, Scott, Murphy & Presser, P.C.

(57) ABSTRACT

A printing apparatus which prints a composite image formed of a background image and an input image on a recording medium includes: a display; a display image data generating section which generates data of a display image to be displayed on the display; a display controller which controls the display; an input region determining mechanism which determines at least one input region in which the input image is to be inputted on the background image displayed on the display; an image capturing mechanism which captures the input image inputted via the display; a composite image data generating section which generates data of the composite image from data of the background image and the input image captured by the image capturing mechanism; and a printing mechanism which prints the composite image on the recording medium based on the data of the composite image generated by the composite image data generating section.

11 Claims, 9 Drawing Sheets

(56) References Cited

U.S. PATENT DOCUMENTS

| | | | |
|---|---|---|---|
| 5,311,259 A * | 5/1994 | Moriya et al. | 399/86 |
| 5,323,173 A * | 6/1994 | Sakuma et al. | 345/668 |
| 5,381,248 A * | 1/1995 | Ikeda et al. | 358/538 |
| 5,394,166 A * | 2/1995 | Shimada | 345/98 |
| 5,502,461 A * | 3/1996 | Okamoto et al. | 345/173 |
| 5,617,528 A * | 4/1997 | Stechmann et al. | 715/201 |
| 5,657,434 A | 8/1997 | Yamamoto et al. | |
| 5,673,079 A * | 9/1997 | Satoh | 348/14.1 |
| 5,703,694 A * | 12/1997 | Ikeda et al. | 358/296 |
| 5,729,255 A * | 3/1998 | Aoki | 715/723 |
| 5,852,447 A * | 12/1998 | Hosoya et al. | 345/468 |
| 5,864,636 A * | 1/1999 | Chisaka | 382/189 |
| 5,867,150 A * | 2/1999 | Bricklin et al. | 345/173 |
| 5,880,728 A * | 3/1999 | Yamaashi et al. | 715/803 |
| 5,900,873 A * | 5/1999 | Isoda et al. | 715/794 |
| 5,940,192 A * | 8/1999 | Ichikawa et al. | 358/530 |
| 6,016,476 A * | 1/2000 | Maes et al. | 705/18 |
| 6,100,878 A * | 8/2000 | Hirayama | 345/179 |
| 6,111,586 A * | 8/2000 | Ikeda et al. | 345/619 |
| 6,222,949 B1 * | 4/2001 | Nakata | 382/298 |
| 6,340,967 B1 * | 1/2002 | Maxted | 345/179 |
| 6,476,868 B1 * | 11/2002 | Kaji et al. | 348/333.12 |
| 6,559,868 B2 * | 5/2003 | Alexander et al. | 715/781 |
| 6,597,378 B1 * | 7/2003 | Shiraishi et al. | 715/764 |
| 6,661,438 B1 * | 12/2003 | Shiraishi et al. | 715/835 |
| 6,731,315 B1 * | 5/2004 | Ma et al. | 715/856 |
| 7,110,147 B1 * | 9/2006 | Hayama et al. | 358/464 |
| 7,250,939 B2 * | 7/2007 | Lira | 345/173 |
| 7,359,087 B2 * | 4/2008 | Tanaka | 358/1.9 |
| 7,463,787 B2 * | 12/2008 | Atsumi et al. | 382/272 |
| 7,607,150 B1 * | 10/2009 | Kobayashi et al. | 725/41 |
| 8,045,232 B2 * | 10/2011 | Kinoshita | 358/3.06 |
| 8,111,946 B2 * | 2/2012 | Izawa et al. | 382/284 |
| 8,149,461 B2 * | 4/2012 | Miyazaki et al. | 358/2.1 |
| 8,176,438 B2 * | 5/2012 | Zaman et al. | 715/815 |
| 8,237,992 B2 * | 8/2012 | Hiramatsu | 358/3.28 |
| 8,286,101 B2 * | 10/2012 | Kupka | 715/863 |
| 2002/0075281 A1 * | 6/2002 | Suzuki et al. | 345/619 |
| 2002/0089514 A1 | 7/2002 | Kitahara et al. | |
| 2002/0089686 A1 | 7/2002 | Kitahara et al. | |
| 2002/0097436 A1 | 7/2002 | Yokoyama et al. | |
| 2003/0002060 A1 | 1/2003 | Yokoyama et al. | |
| 2003/0090495 A1 * | 5/2003 | Tomita | 345/619 |
| 2003/0179219 A1 * | 9/2003 | Nakano et al. | 345/660 |
| 2004/0027312 A1 * | 2/2004 | Owada et al. | 345/8 |
| 2004/0061900 A1 * | 4/2004 | Tanaka | 358/1.18 |
| 2004/0095394 A1 * | 5/2004 | Fox et al. | 345/800 |
| 2004/0223197 A1 * | 11/2004 | Ohta et al. | 358/538 |
| 2005/0122412 A1 * | 6/2005 | Shirakawa et al. | 348/239 |
| 2005/0134939 A1 * | 6/2005 | Ikeda et al. | 358/471 |
| 2005/0213174 A1 | 9/2005 | Maki et al. | |
| 2006/0061787 A1 * | 3/2006 | Kinjo | 358/1.9 |
| 2006/0114520 A1 * | 6/2006 | Enomoto et al. | 358/448 |
| 2006/0170968 A1 | 8/2006 | Maki et al. | |
| 2006/0187477 A1 | 8/2006 | Maki et al. | |
| 2006/0256409 A1 * | 11/2006 | Hiramatsu | 358/538 |
| 2006/0279814 A1 * | 12/2006 | Fukada et al. | 358/540 |
| 2007/0058868 A1 * | 3/2007 | Seino et al. | 382/187 |
| 2007/0139674 A1 * | 6/2007 | Kawano et al. | 358/1.9 |
| 2008/0013112 A1 | 1/2008 | Yokoyama et al. | |
| 2008/0068402 A1 * | 3/2008 | Ioka et al. | 345/660 |
| 2008/0186255 A1 * | 8/2008 | Cohen et al. | 345/8 |
| 2008/0228866 A1 * | 9/2008 | Minatogawa et al. | 709/203 |
| 2008/0240493 A1 * | 10/2008 | Yoda | 382/100 |
| 2008/0266600 A1 | 10/2008 | Itoh | |
| 2008/0309993 A1 * | 12/2008 | McKinley et al. | 358/474 |
| 2009/0022426 A1 * | 1/2009 | Yamazaki | 382/296 |
| 2009/0048000 A1 * | 2/2009 | Ade-Hall | 455/566 |
| 2009/0079764 A1 * | 3/2009 | Lin et al. | 345/660 |
| 2009/0091772 A1 * | 4/2009 | Ujiie et al. | 358/1.9 |
| 2009/0135147 A1 * | 5/2009 | Hsu et al. | 345/173 |
| 2009/0262219 A1 * | 10/2009 | Shirakawa et al. | 348/239 |
| 2010/0066861 A1 * | 3/2010 | Sakagami | 348/231.6 |
| 2010/0194753 A1 * | 8/2010 | Robotham et al. | 345/428 |
| 2010/0214323 A1 * | 8/2010 | Sakaue | 345/661 |
| 2010/0231521 A1 * | 9/2010 | Nishimura | 345/169 |
| 2010/0275163 A1 * | 10/2010 | Gillespie et al. | 715/810 |
| 2010/0283800 A1 * | 11/2010 | Cragun et al. | 345/661 |
| 2010/0302281 A1 * | 12/2010 | Kim | 345/661 |
| 2011/0025718 A1 * | 2/2011 | Takarabe | 345/661 |
| 2011/0057947 A1 * | 3/2011 | Kobayashi et al. | 345/592 |
| 2011/0072393 A1 * | 3/2011 | Wilairat | 715/811 |
| 2011/0122153 A1 * | 5/2011 | Okamura et al. | 345/629 |
| 2011/0157028 A1 * | 6/2011 | Stallings et al. | 345/173 |
| 2011/0193993 A1 * | 8/2011 | Yeom et al. | 348/231.3 |
| 2011/0279457 A1 * | 11/2011 | Song | 345/428 |
| 2012/0038626 A1 * | 2/2012 | Kim | 345/419 |
| 2012/0068948 A1 * | 3/2012 | Tomoda | 345/173 |
| 2012/0086835 A1 * | 4/2012 | Matsuzaka | 348/240.99 |
| 2012/0092369 A1 * | 4/2012 | Kim et al. | 345/633 |
| 2012/0249594 A1 * | 10/2012 | Tsue et al. | 345/641 |
| 2012/0256866 A1 * | 10/2012 | Yu et al. | 345/173 |
| 2012/0306779 A1 * | 12/2012 | Weeldreyer et al. | 345/173 |
| 2013/0285962 A1 * | 10/2013 | Ade-Hall, Martin | 345/173 |

FOREIGN PATENT DOCUMENTS

| | | |
|---|---|---|
| JP | 2003191567 A | 7/2003 |
| JP | 2006-287381 | 10/2006 |
| JP | 2006287744 A | 10/2006 |
| JP | 2008149676 A | 7/2008 |
| JP | 2008276576 A | 11/2008 |

* cited by examiner

PRINTING APPARATUS, COMPOSITE IMAGE DATA GENERATING APPARATUS, AND COMPOSITE IMAGE DATA GENERATING PROGRAM

CROSS REFERENCE TO RELATED APPLICATION

The present application claims priority from Japanese Patent Application No. 2009-178846, filed on Jul. 31, 2009, the disclosure of which is incorporated herein by reference in its entirety.

BACKGROUND OF THE INVENTION

1. Field of the Invention

The present invention relates to a printing apparatus printing a composite image obtained by synthesizing a background image displayed on a display screen and an input image inputted on the display screen, a composite image data generating apparatus generating data of the composite image, and a composite image data generating program.

2. Description of the Related Art

In a multifunction machine disclosed in US Patent Application Publications No. 2005/0213174A1, 2006/0170968A1, and 2006/0187477A1 (corresponding to Japanese Patent Application Laid-open No. 2006-287381), a user operates an operation unit, and thereby an order sheet on which a sample patch of a background image is printed is printed. When an input image is drawn on the above order sheet by hand and then the order sheet is read by a scanner, a composite image obtained by synthesizing the background image and the input image is printed. Further, in US Patent Application Publications No. 2006/0170968A1 and 2006/0187477A1, there is a description that the above-described operation unit may also be constituted as a touch panel.

SUMMARY OF THE INVENTION

Here, in the case when the operation unit is constituted as a touch panel, it is also possible to consider that the order sheet is displayed on a display screen of the touch panel instead of printing the order sheet, and an input image is drawn on the display screen, and thereby a composite image similar to the above-described one is printed.

However, in the above case, the display screen of the touch panel to be provided on the multifunction machine is small in general for the purpose of miniaturization of the machine or the like. Accordingly, it is difficult to input the input image by directly drawing an image on the display screen while an entire background image is displayed on the display screen.

Thus, in order to facilitate input of an image in an apparatus having a small display screen of a touch panel, the inventor of the present application has assumed that an enlarged image of a portion of a background image is displayed on a display screen, and in the above state, an image is directly drawn on the display screen, and thereby inputting the image. However, in the above case, when an image is drawn directly on the display screen, it is not easy to comprehend a position, a size, a direction, and so on of the image being drawn with respect to the background image, and it is difficult to input the image in a desired region of the background image.

An object of the present invention is to provide a printing apparatus which prints a composite image of a background image displayed on a display screen and an image inputted on the display screen, and which enables a user to input an input image in a desired region of the background image easily, a composite image data generating apparatus generating image data of the composite image, and a composite image data generating program.

According to a first aspect of the present invention, there is provided a printing apparatus being a printing apparatus printing a composite image obtained by synthesizing a background image displayed on a display screen and an input image input via the display screen on a recording medium, the printing apparatus including: a display image data generating section generating data of a display image to be displayed on the display screen; a display mechanism having the display screen and displaying the display image on the display screen based on the data of the display image generated in the display image data generating section; a input region determining mechanism determining a input region where the input image is placed, on the background image displayed on the display screen; an image capturing mechanism obtaining the input image input via the display screen; a composite image data generating section generating data of the composite image from data of the background image and data of the input image obtained in the image capturing mechanism; and a printing mechanism printing the composite image on the recording medium based on the data of the composite image generated in the composite image data generating section, and in which the display image data generating section generates as the data of the display image, data of an enlarged image of a portion, of the background image, including the input region when the input region is determined in the input region determining mechanism, and the image capturing mechanism obtains an image input on the display screen as the input image while the enlarged image is displayed on the display screen.

According to the above, a user can input an input image while an enlarged image of a portion including a input region of a background image is displayed, so that it is possible to input an input image easily even when a display screen is small.

On the other hand, before an input image is input, a input region where the input image is placed is designated in a state where a somewhat wide range of a background image, which is, for example, the entire background image, or the like, is displayed on a display screen. Thus, in designating the input region, it is easy to recognize a position, a size, a direction, and so on of the input region to the background image, resulting that the input image can be input in a desired region of the background image.

According to a second aspect of the present invention, there is provided a composite image data generating apparatus being a composite image data generating apparatus generating data of a composite image obtained by synthesizing a background image displayed on a display screen and an input image input via the display screen, the composite image data generating apparatus including: a display image data generating section generating data of a display image to be displayed on the display screen; a display mechanism having the display screen and displaying the display image on the display screen based on the data of the display image generated in the display image data generating section; a input region determining mechanism determining a input region where the input image is placed, on the background image displayed on the display screen; an image capturing mechanism obtaining the input image directly drawn on the display screen; and a composite image data generating section generating data of the composite image from data of the background image and data of the input image obtained in the image capturing mechanism, and in which the display image data generating section generates as the data of the display image, data of an enlarged image of a first portion, of the background image, including the input region when the input region is determined in the input region determining mechanism, and the image capturing mechanism obtains an image input via the display screen as the input image while the enlarged image is displayed on the display screen.

According to a third aspect of the present invention, there is provided a program being a program for controlling a composite image data generating apparatus generating data of a composite image obtained by synthesizing a background image displayed on a display screen and an input image input via the display screen, the program causing a computer to execute: a input region determining step determining a input region where the input image is placed, on the background image displayed on the display screen by receiving an input externally; an enlarged image data generating step generating data of an enlarged image of a portion, of the background image, including the input region determined in the input region determining step; an enlarged image display step displaying the enlarged image on the display screen based on the data of the enlarged image generated in the enlarged image data generating step; an image obtaining step obtaining an image input via the display screen where the enlarged image is displayed as the input image; and a composite image data generating step generating data of the composite image from image data of the background image and data of the input image obtained in the image obtaining step.

BRIEF DESCRIPTION OF THE DRAWINGS

FIG. 1A and FIG. 1B are schematic structural views of a printer according to an embodiment of the present invention, and FIG. 1A shows a state in which a cover is closed and FIG. 1B shows a state in which the cover is open;

DETAILED DESCRIPTION OF THE PREFERRED EMBODIMENTS

Hereinafter, a preferred embodiment of the present invention will be explained.

Figure 1A:
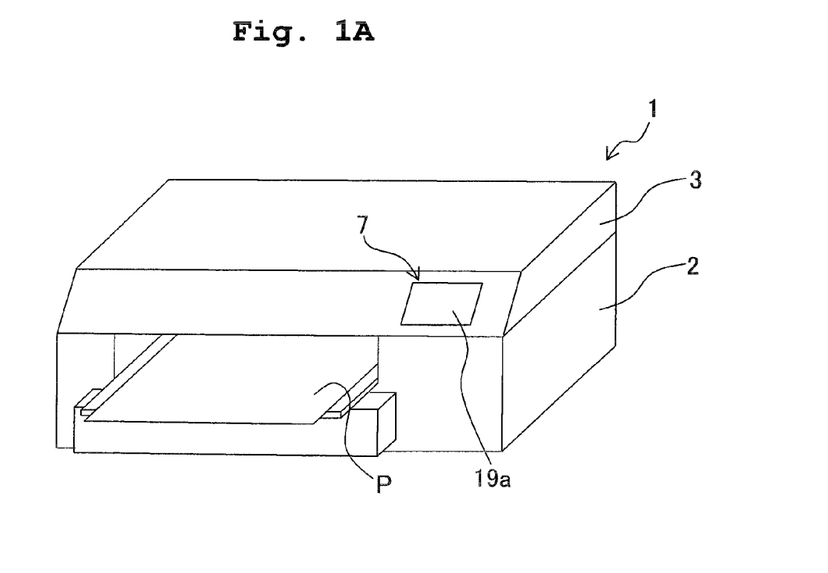
Figure 1B:
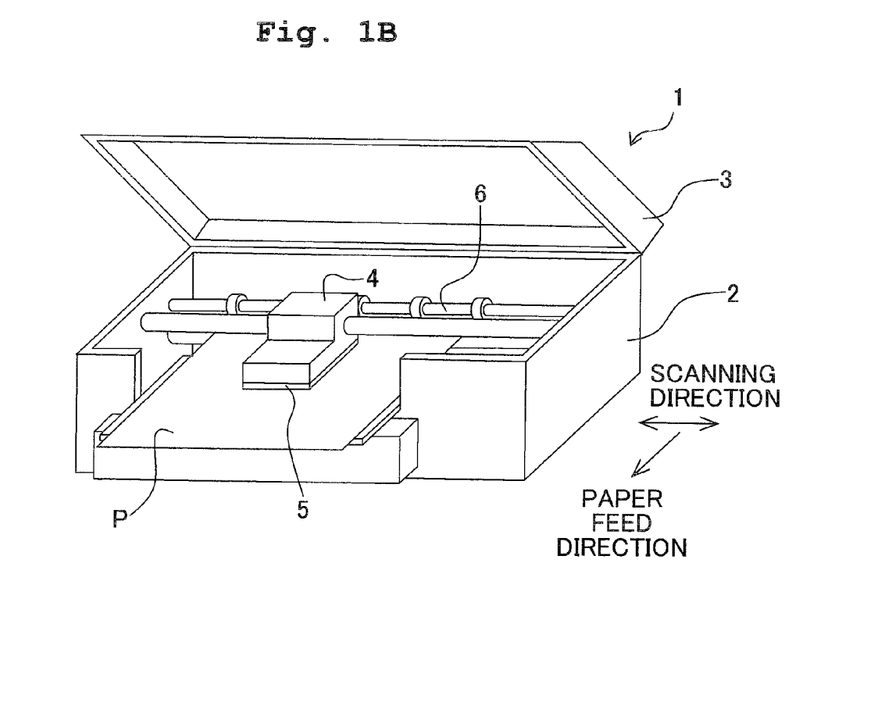

As shown in FIG. 1A and FIG. 1B, a printer 1 includes a main body case 2, a cover 3, a carriage 4, an ink-jet head 5, a paper feed roller 6, a touch panel 7, and so on. Further, operations of the printer 1 are controlled in a later-described control device 40 (see FIG. 3).

The main body case 2 is a case in a box shape of which upper surface is open. The cover 3 is provided to cover the opening of the upper surface of the main body case 2. Then, the printer 1 is normally used with the cover 3 closed, and maintenance and the like for the ink-jet head 5 can be performed when the cover 3 is opened.

The carriage 4 is disposed inside the main body case 2 and reciprocates in a scanning direction (right and left direction in FIGS. 1A and 1B). The ink jet head 5 is attached to a lower surface of the carriage 4, and jets ink from a plurality of nozzles that are not shown and formed on a lower surface of the ink-jet head 5. The paper feed roller 6 is disposed inside the main body case 2 and transports a recording paper P in a paper feed direction (near side direction in FIGS. 1A and 1B). The combination of the carriage 4, the ink-jet head 5, and the paper feed roller 6 corresponds to a printing mechanism according to the present invention.

Then, in the printer 1, printing on the recording paper P (a recording medium) is performed in such a manner that the ink is jetted from the ink-jet head 5 which reciprocates together with the carriage 4 in the scanning direction to the recording paper P transported by the paper feed roller 6.

The touch panel 7 is disposed on a surface of the cover 3 on the near side in FIGS. 1A and 1B. The touch panel 7 includes a display 19 exposed on the surface of the cover 3 on the near side in FIGS. 1A and 1B. The display 19 includes a display screen 19a (see FIG. 3) on which an image to be printed in the printer 1, buttons for operating the printer 1, and so on are displayed and a detecting sensor 18 (see FIG. 3) detecting a position touched by a user when the user touches the display screen 19a with his/her finger, a dedicated pen or the like. Note that a constitution of the touch panel 7 is similar to that of a conventional one, and thus a detailed explanation thereof is omitted here.

Figure 2:
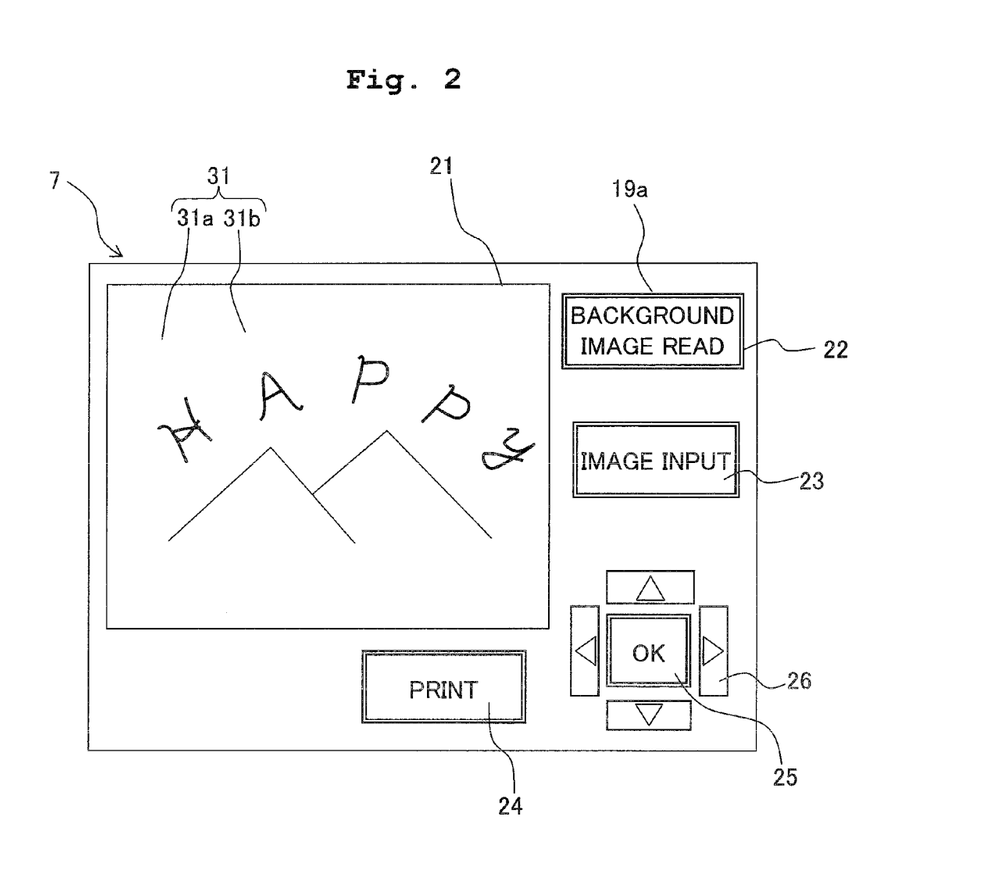
FIG. 2 is a view showing an image to be displayed on a display screen of a touch panel in FIG. 1A.

As shown in FIG. 2, on the display screen 19a, a print image display portion 21, a background image read button 22, an image input button 23, a print button 24, a determination button (O.K. button) 25, four direction buttons 26, and so on are displayed.

The print image display portion 21 is a substantially rectangular portion placed in a region extending continuously from a left upper end portion to a substantially center portion of the display screen 19a, on which an image to be printed in the printer 1 is displayed. Here, the printer 1, in addition to normal printing in which a read image is printed as it is, can set a read image as a background image 31a and print a composite image obtained by synthesizing input images 31b directly drawn on the display screen 19a (which are letters of "H" "A" "P" "P" "Y" in the drawing) in the background image 31a. FIG. 2 shows a state where a composite image 31 is displayed on the print image display portion 21. Note that the input image 31b directly drawn on the display screen 19a is not limited to the letter shown in FIG. 2 and it may also be a figure, an illustration, or the like.

The background image read button 22, the image input button 23, the print button 24, the determination button 25, and the four direction buttons 26 are buttons displayed on the display screen 19a. The user touches these buttons with his/her finger, a dedicated pen or the like, thereby enabling functions corresponding to the respective buttons to be executed as will be explained below. Note that these buttons 22 to 26 are not limited to be displayed on the display screen 19a of the touch panel 7, and they may also be disposed outside the touch panel 7 as actual buttons.

The background image read button 22 is placed at a right upper end portion of the display screen 19a. When the user touches the background image read button 22, for example, a not-shown pop-up window, on which image data capable of being set as the background image 31a are list-displayed, is displayed on the display screen 19a, or the like, and thereby the user can select image data to be the background image 31a.

The image input button 23 is placed below the background image read button 22. When the user touches the image input button 23, the display screen 19a is brought into a state that the user can designate a input region 51 (see FIG. 4A to FIG. 4D) and input the input image 31b in the input region 51, which will be described later.

The print button 24 is placed below the print image display portion 21. When the user touches the print button 24, an image displayed on the print image display portion 21 is printed in the printer 1.

The determination button 25 is placed at a right lower end portion of the display screen 19a. The user can determine the above-described selection of image data to be the background image 31a, the later-described designation of the input region 51 (see FIG. 4A to FIG. 4D), and the input of the input image 31b, and the like, by touching the determination button 25.

The four direction buttons 26 are placed above, below, to the left of, and to the right of the determination button 25 respectively. The user can select image data to be the background image 31a described above, and the like, by touching the four direction buttons 26.

Next, the control device 40 controlling the printer 1 will be explained.

Figure 3:
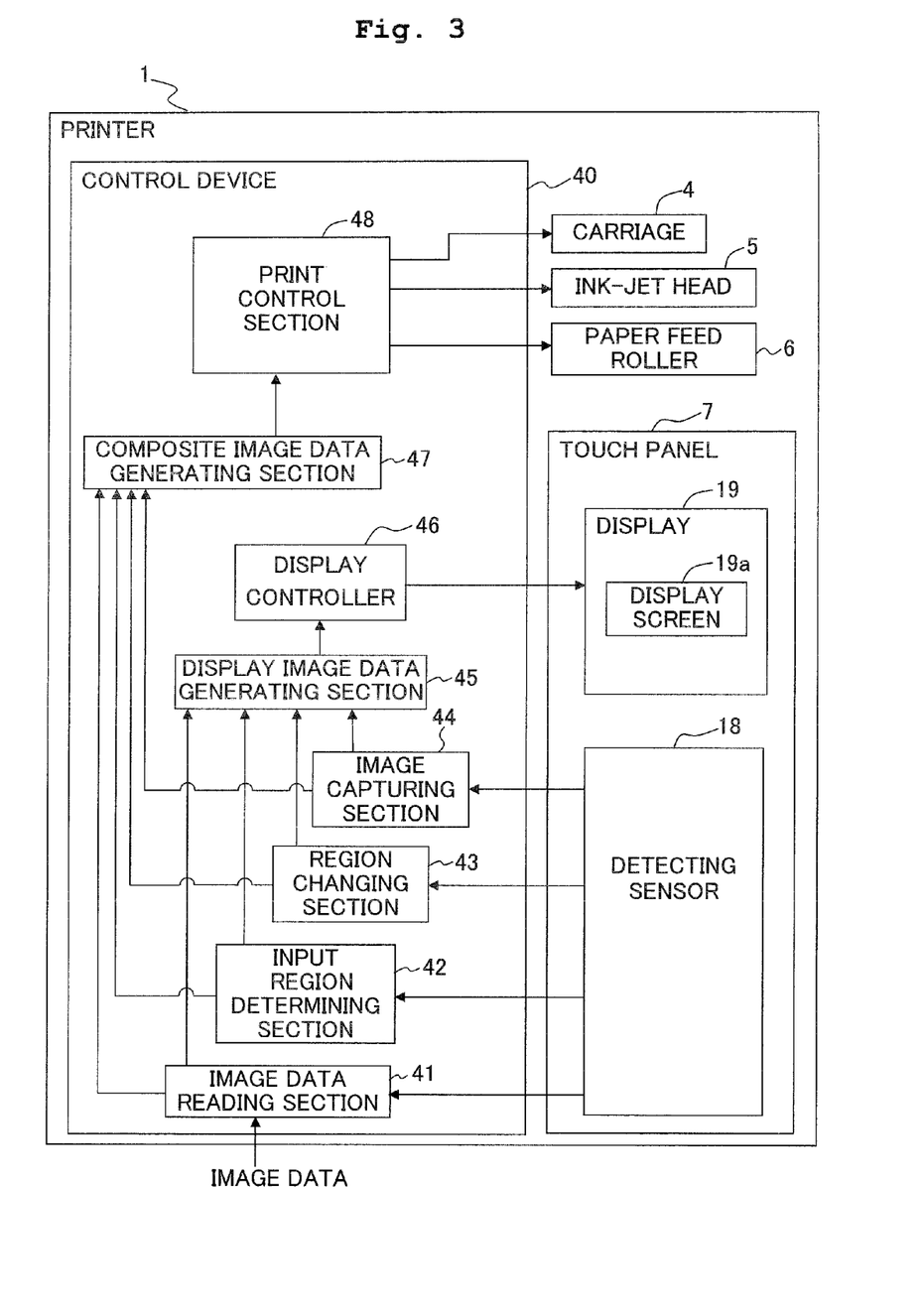
FIG. 3 is a functional block diagram showing a configuration of the printer including a control device controlling the printer in FIG. 1A and FIG. 1B.

The control device 40 is configured by a CPU (Central Processing Unit), a ROM (Read Only Memory), a RAM (Random Access Memory), and so on, and these function as an image data reading section 41, a input region determining section 42, a region changing section 43, an image capturing section 44, a display image data generating section 45, a display controller 46, a composite image data generating section 47, a print control section 48, and so on as shown in FIG. 3.

The image data reading section 41 reads data of the background image 31a. Concretely, as described above, a user touches the background image read button 22, and thereby the above-described pop-up window of a list of image data is displayed, for example. When a user touches the direction buttons 26 in the above state, image data being selected in the pop-up window is switched. Then, when a user touches the determination button 25, the image data being selected is determined as image data of the background image 31a. Then, the corresponding image data is read from a not-shown memory card inserted into the printer 1, or the like.

The input region determining section 42 determines the input regions 51 (see FIG. 4A to FIG. 4D) at which the input images 31b are placed, based on markers 52 (see FIG. 4B to FIG. 4D) drawn on the print image display portion 21 as will be described later. Note that, in this embodiment, the combination of the detecting sensor 18 of the touch panel 7 and the input region determining section 42 corresponds to a input region determining mechanism according to the present invention.

The region changing section 43 changes a position, a size, and a direction (up and down direction) of the input region 51 determined in the input region determining section 42 in accordance with changes of a position, a size, and a direction of the marker 52 (see FIG. 4B to FIG. 4D) to be performed on the print image display portion 21 as will be described later. Further, when the input region 51 is changed, a position, a size, or a direction (corresponding one) of the input image 31b inputted in the input region 51 is also changed together. Note that in this embodiment, the combination of the detecting sensor 18 of the touch panel 7 and the region changing section 43 corresponds to a region changing mechanism according to the present invention.

The image capturing section 44 captures an image inputted on the print image display portion 21 as the input image 31b in a state that the input image 31b can be inputted as will be described later. Note that, in this embodiment, the combination of the detecting sensor 18 of the touch panel 7 and the image capturing section 44 corresponds to an image capturing mechanism according to the present invention.

The display image data generating section 45 generates image data of display images to be displayed on the print image display portion 21, which are image data of the background image 31a, the input images 31b, frames 51a (see FIG. 4B to FIG. 4D) showing the input regions 51, the markers 52 (see FIG. 4B to FIG. 4D), and to be displayed on the display screen 19a, which are image data of the operation buttons 22 to 26, and the like. The display controller 46 controls the display 19 to display the images corresponding to the image data generated in the display image data generating section 45 on the display screen 19a. Note that, in this embodiment, the combination of the display 19 with the display screen 19a that constitutes the touch panel 7 and the display controller 46 corresponds to a display mechanism according to the present invention.

The composite image data generating section 47 generates image data of the composite image 31 from the data of the image read by the image data reading section 41 and the data of the input image 31b captured by the image capturing section 44.

The print control section 48 controls the carriage 4, the ink jet head 5, and the paper feed roller 6 to print the composite image 31 corresponding to the data of the composite image generated in the composite image data generating section 47. Note that, in this embodiment, the combination of the carriage 4, the ink-jet head 5, the paper feed roller 6, and the print control section 48 controlling these components corresponds to a printing section according to the present invention.

Next, a procedure to print the composite image 31 in the printer 1 will be explained with reference to FIG. 4A to FIG. 4D.

Figure 4A:
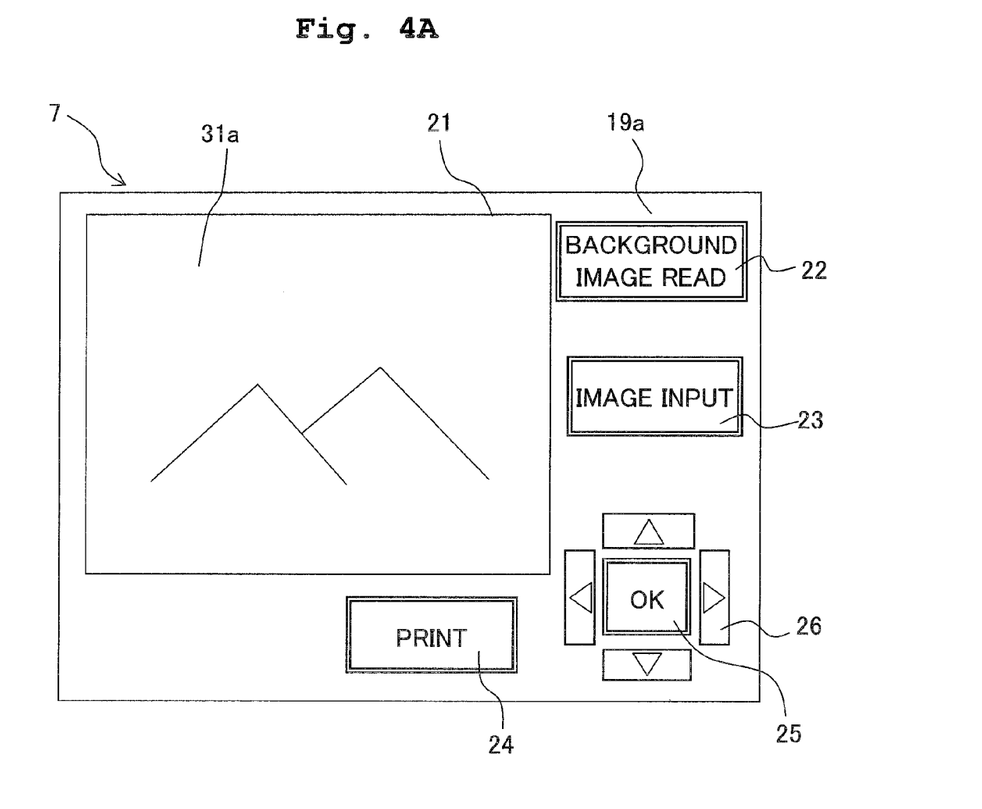
FIG. 4A to FIG. 4D are views showing a procedure to print a composite image in the printer in FIG. 1A and FIG. 1B.

First, the background image 31a is read as shown in FIG. 4A in order to print the composite image 31 in the printer 1. Concretely, as described above, when a user touches the background image read button 22, the not-shown pop-up window in which image data are list-displayed is displayed. When image data of an image to be the background image 31a is selected from the list-displayed image data by the user, the data of the corresponding image is read. Note that, when the background image 31a is read and then the print button 24 is operated without performing an input of the input image 31b that will be explained below, the background image 31a can be printed as it is.

Figure 4B:
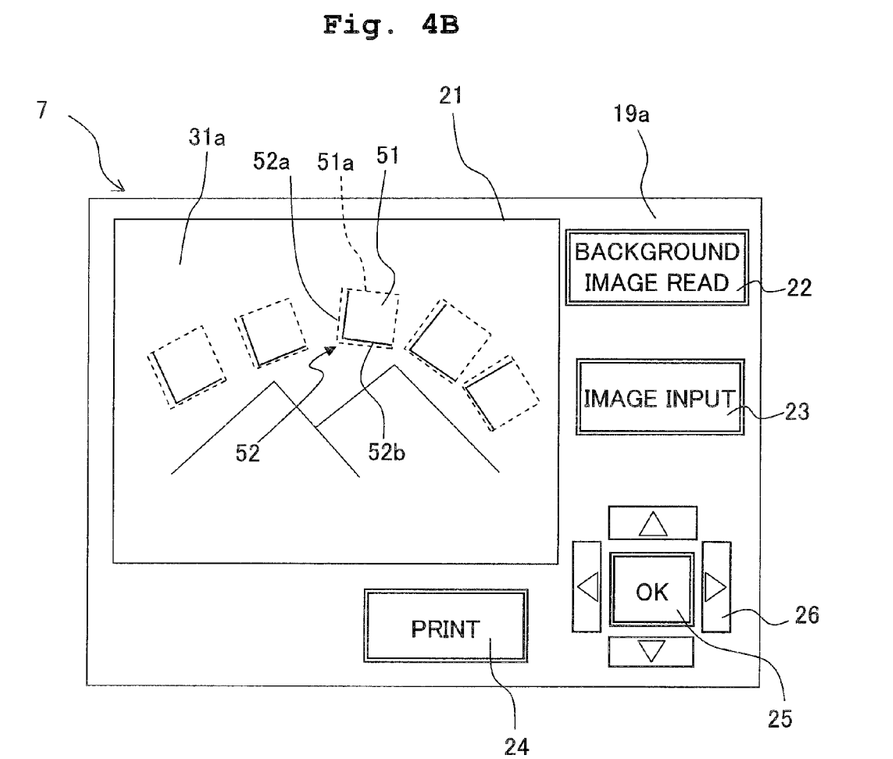

Next, as shown in FIG. 4B, the input regions 51 in which the input images 31b are inputted are determined (a input region determining step). Concretely, when a user touches the image input button 23 after reading the background image 31a, the print image display portion 21 is brought into a state that the user can designate the input regions 51 in which the input images 31b are inputted. In the above state, when the user draws the marker 52 in a substantially L-shape composed of a vertical line 52a and a horizontal line 52b on the print image display portion 21 with his/her finger, a dedicated pen, or the like, a rectangular region surrounded by the frame 51a is designated as the input region 51. Namely, in the input region 51, a direction of the vertical line 52a indicates the up and down direction (a first direction) and a direction of the horizontal line 52b indicates the right and left direction (a second direction) and lengths of the vertical line 52a and the horizontal line 52b indicate lengths of the input region 51 in the up and down direction and the right and left direction respectively.

Then, the user touches the determination button 25 after the designations of all the input regions 51 are completed, and thereby the designations of the input regions 51 are determined. Here, the markers 52 drawn in order to designate the input regions 51 are later displayed on the print image display portion 21 when a portion, of the background image 31a, including the input region 51 is displayed. That is, the display image data generating section 45 generates data of an image to which the markers 52 (marks) are added as the data of the display image, after the input regions 51 are designated. Accordingly, the user can recognize up and down directions of the input regions 51 from the directions of the vertical lines 52a of the markers 52.

Figure 4C:
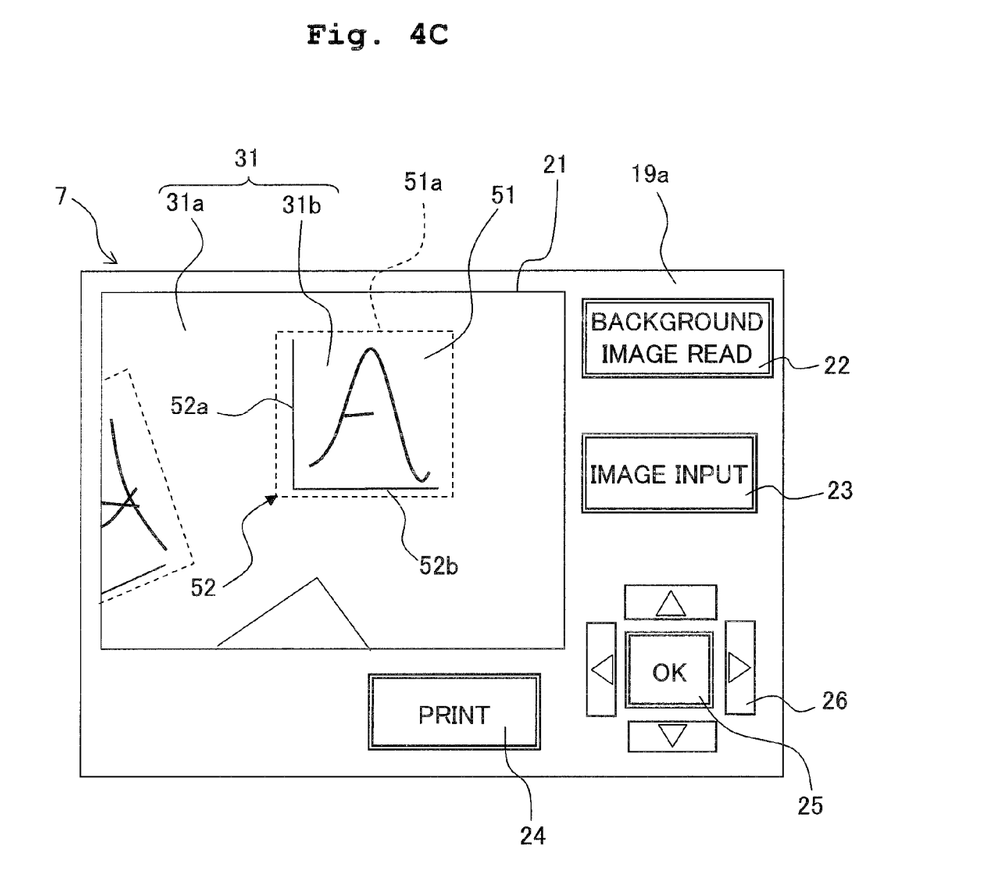

When a user touches the determination button 25 and thereby the designations of the input regions 51 are determined, the display image data generating section 45, in the case when the plural input regions 51 are designated, generates image data of an enlarged image as the data of the display image, so that a portion, of the background image 31a, including one of the input regions 51 includes at least a part of another input region 51 adjacent to the one input region 51 (an enlarged image data generating step). For example, when generating enlarged image data, the display image data generating section 45 may generate image data of an enlarged image so that an area of the adjacent input region 51 at a predetermined ratio and an entire area of the one of the input regions 51 are displayed together on the print image display portion 21. Then, as shown in FIG. 4C, based on the generated enlarged image data, the above-described enlarged image is displayed on the print image display portion 21 (an enlarged image display step).

In this embodiment, the enlarged image is displayed on the print image display portion 21 so that the portion, of the background image 31a, including the single input region 51 in which the input image 31b is to be inputted includes at least the part of the input region 51 adjacent to the single input region 51, but an enlarged image may also be displayed so that the portion, of the background image 31a, including the single input region 51 in which the input image 31b is to be inputted includes at least part of another input region 51 different from the adjacent input region 51.

On the other hand, in the case when only the single input region 51 is designated, the display image data generating section 45 generates image data of an enlarged image of only the above-described portion, of the background image 31a, including the single input region 51 as the data of the display image, and thereby the enlarged image of only the above-described portion including the single input region 51 is displayed on the print image display portion 21.

Further, when the up and down direction of the input region 51 (direction of the vertical line 52a) inclines relative to the up and down direction of the display screen 19a (up and down direction in FIG. 4A to FIG. 4D), the display image data generating section 45 generates, as the data of the display image, image data of an enlarged image which is rotated so that the up and down direction of the input region 51 coincides with the up and down direction of the display screen 19a. Accordingly, the above-described portion, of the background image 31a, including the single input region 51 is displayed on the print image display portion 21 in a state in which it is rotated so that the up and down direction of the input region 51 coincides with the up and down direction of the display screen 19a.

Then, when an image is inputted in the input region 51 being displayed in an enlarged manner on the print image display portion 21 by the user with his/her finger, a dedicated pen, or the like as shown in FIG. 4C in a state that the enlarged image of the portion, of the background image 31a, including the input region 51 is displayed on the print image display portion 21 (in the drawing, a state that the letter of "A" is being drawn is shown), the image capturing section 44 captures the image as the input image 31b. In this manner, the input image 31b is inputted (an image obtaining step).

Further, if the plural input regions 51 are designated in inputting the input image 31b in this manner, when the user touches, for example, the direction buttons 26, an enlarged image to be displayed on the print image display portion 21 is switched, and enlarged images of portions, of the background image 31a, each including one of the input regions 51 are displayed sequentially.

Here, in inputting the input image 31b, unlike this embodiment, it is also possible to consider that the user directly draws an image on the print image display portion 21 in a state that the entire background image 31a is displayed on the print image display portion 21, and thereby the input image 31b is inputted.

However, an area of the display screen 19a of the display 19 constituting the touch panel 7, which is provided on the printer 1, is required to be reduced in general for the purpose of miniaturization of the printer 1 or the like. Thus, it is difficult to input the input image 31b in one portion of the background image 31a by directly drawing the input image 31b on the display screen 19a while the entire background image 31a is displayed on the print image display portion 21.

In contrast, in this embodiment, the input regions 51 in which the input images 31b are inputted are designated while the entire background image 31a is displayed on the print image display portion 21, and thereafter the input image 31b is inputted while an enlarged image of a portion, of the background image 31a, including the input region 51 is displayed. Accordingly, the user can input the input image 31b easily.

Further, in this embodiment, when the up and down direction of the input region 51 inclines relative to the up and down direction of the display screen 19a, an enlarged image, which is obtained by rotating a portion, of the background image 31a, including the input region 51 so that the up and down direction of the input region 51 coincides with the up and down direction of the display screen 19a, is displayed. Therefore, a user can input the input image 31b without being conscious of an inclination of the up and down direction of the input region 51 relative to the up and down direction of the display screen 19a. Accordingly, the input of the input image 31b is further facilitated.

At this time, the marker 52 is displayed together with the portion, of the background image 31a, including the input region 51. Thus, when seeing that the directions of the vertical line 52a and the horizontal line 52b in the marker 52 coincide with the up and down direction and the right and left direction of the display screen 19a respectively, a user can recognize that the displayed enlarged image is rotated so that the up and down direction of the input region 51 coincides with the up and down direction of the display screen 19a. Accordingly, there is no case that a user misunderstands that the enlarged image being displayed is not rotated, and thus it is possible to prevent the user from inputting the input image 31b while misunderstanding as above.

Additionally, since the enlarged image is displayed so that the portion, of the background image 31a, including the single input region 51 includes at least the part of the input region 51 adjacent to the single input region 51 in this embodiment, a user can input the input image 31b in the input region 51 while seeing the input image 31b already inputted in the adjacent input region 51 to balance. Accordingly, the input of the input image 31b is further facilitated.

Unlike this embodiment, it is also possible to consider inputting the input image 31b in a state that the input region 51 is not designated and an enlarged image of one portion of the background image 31a is displayed on the print image display portion 21. However, in the above case, when inputting the input image 31b by directly drawing an image on the print image display portion 21, it is not easy for a user to comprehend a position, a size, a direction, and so on of the image being drawn to the background image 31a. Thus, it is difficult to input the input image 31b in a desired region of the background image 31a.

In contrast, in this embodiment, a user can designate the input regions 51 without restraint while the entire background image 31a is displayed on the print image display portion 21. Thus, it is easy to comprehend the positions, the sizes, the directions, and so on of the input regions 51 with respect to the entire background image 31a when designating the input regions 51. As a result, it is possible to input the input images 31b in desired regions of the background image 31a.

Figure 4D:
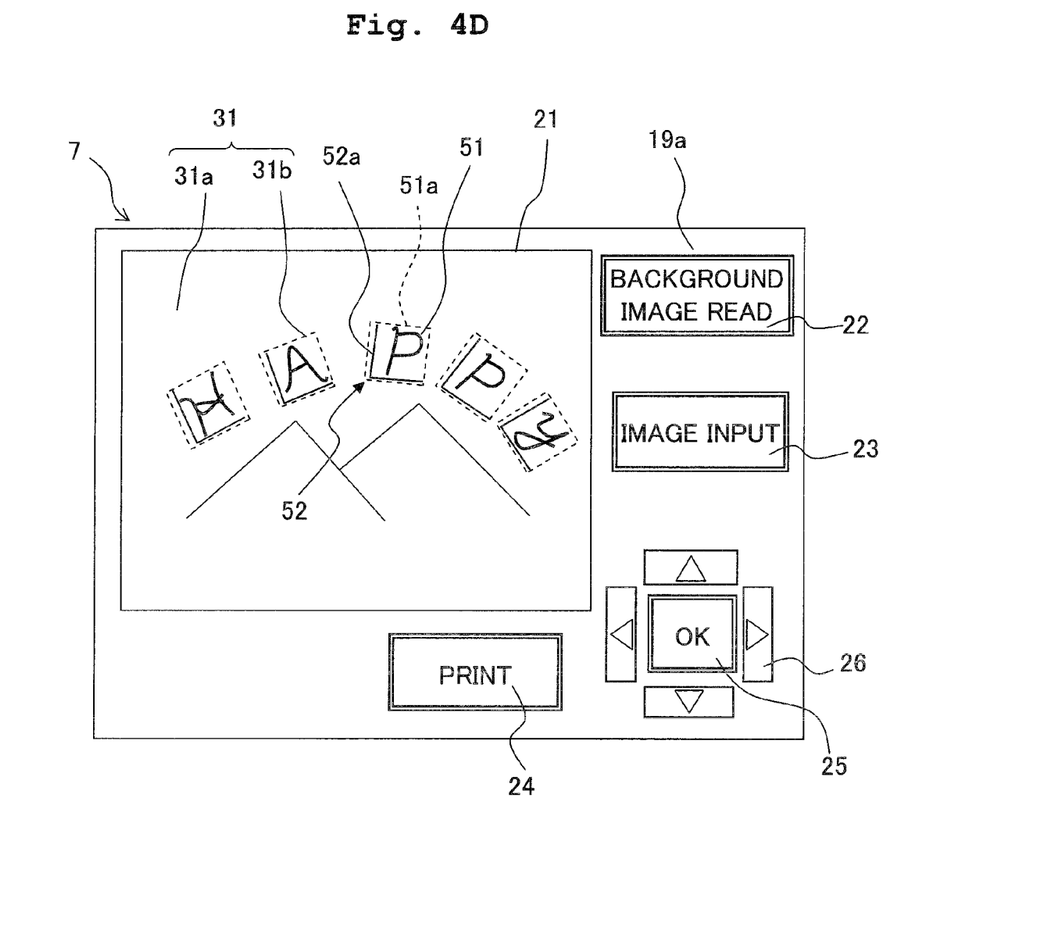

Then, when a user touches the determination button 25 after the inputs of the input images 31b in all the input regions 51 are completed by a user, as shown in FIG. 4D, the entire background image 31a in which the input images 31b are inputted is displayed on the print image display portion 21.

In the above state, when a user touches the vertical line 52a and the horizontal line 52b in the marker 52 displayed on the print image display portion 21 with his/her finger, a dedicated pen, or the like, for example, the position of the marker 52, the lengths and the directions (up and down direction) of the vertical line 52a and the horizontal line 52b can be changed. When the position of the marker 52, the lengths and the directions of the vertical line 52a and the horizontal line 52b are changed, the position, the size, and the direction of the input region 51 are changed together with the position, the size, and the direction of the input image 31b inputted in the input region 51 according to the above change.

In this manner, after designating the input regions 51 and inputting the input images 31b, a user can see the entire background image 31a in which the input images 31b are placed in the input regions 51. Then, when a user desires to change the position, the size, and the direction of the input image 31b, a user can fine-adjust the position, the size, and the direction of the input image 31b by changing the position of the marker 52, the lengths and the directions of the vertical line 52a and the horizontal line 52b.

Then, when the fine-adjustment of the position of the input image 31b and the like are all completed and then a user touches the determination button 25, the rectangular frames 51a showing the input regions 51 and the markers 52 disappear and the print image display portion 21 is brought into a state where only the composite image 31 as shown in FIG. 2 is displayed on the print image display portion 21. Then, when a user touches the print button 24 after confirming the composite image 31 being displayed on the print image display portion 21, image data of the composite image 31 obtained by synthesizing the input images 31b in the background image 31a is generated in the composite image data generating section 47 from the image data of the background image 31a and the data of the input images 31b which are inputted by the user (a composite image data generating step).

Then, the print control section 48 controls the carriage 4, the ink-jet head 5, and the paper feed roller 6 based on the above image data, and the composite image 31 corresponding to the above image data is printed in the printer 1.

Next, modified examples in which various modifications are added to this embodiment will be explained. However, components having the constitutions similar to those of this embodiment will be denoted by the same reference numerals and symbols, and explanation thereof is omitted when convenient.

Figure 5:
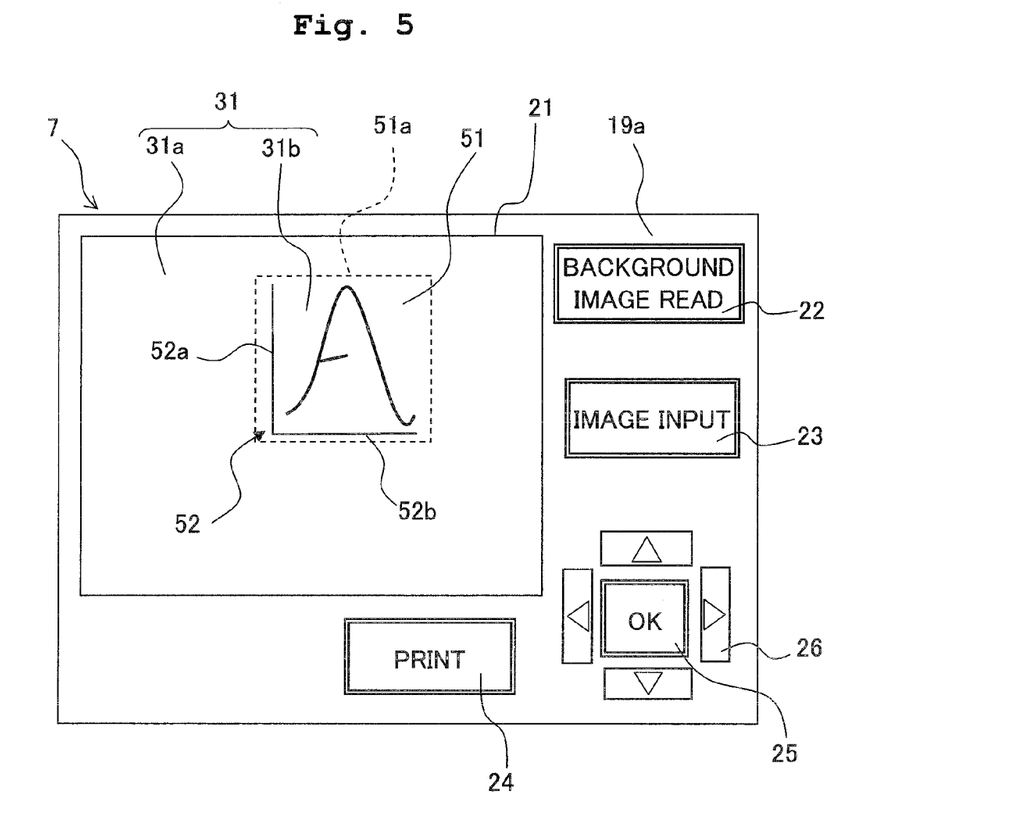
FIG. 5 is a view in a modified example 1 corresponding to FIG. 4C.

In one modified example (a modified example 1), even in the case when the plural input regions 51 are designated, an enlarged image of only a portion, of the background image 31a, including the input region 51 in which the input image 31b is to be inputted is displayed on the print image display portion 21 as shown in FIG. 5. In the enlarged image, part of another input region 51 is not included. That is, at this time, as the data of the display image, the display image data generating section 45 generates image data of the enlarged image of the portion, of the background image 31a, including only the input region 51 in which the input image 31b is to be inputted.

In the above case, a user cannot input the input image 31b while seeing the input image 31b already inputted in another input region 51. However, it is possible to further enlarge the portion, of the background image 31a, including the input region 51 in which the input image 31b is to be inputted to display it on the print image display portion 21, since another input region 51 is not displayed on the print image display portion 21. Thus, it is possible to input the input image 31b easily in the case when the input image 31b is a complex image, or the like.

Figure 6:
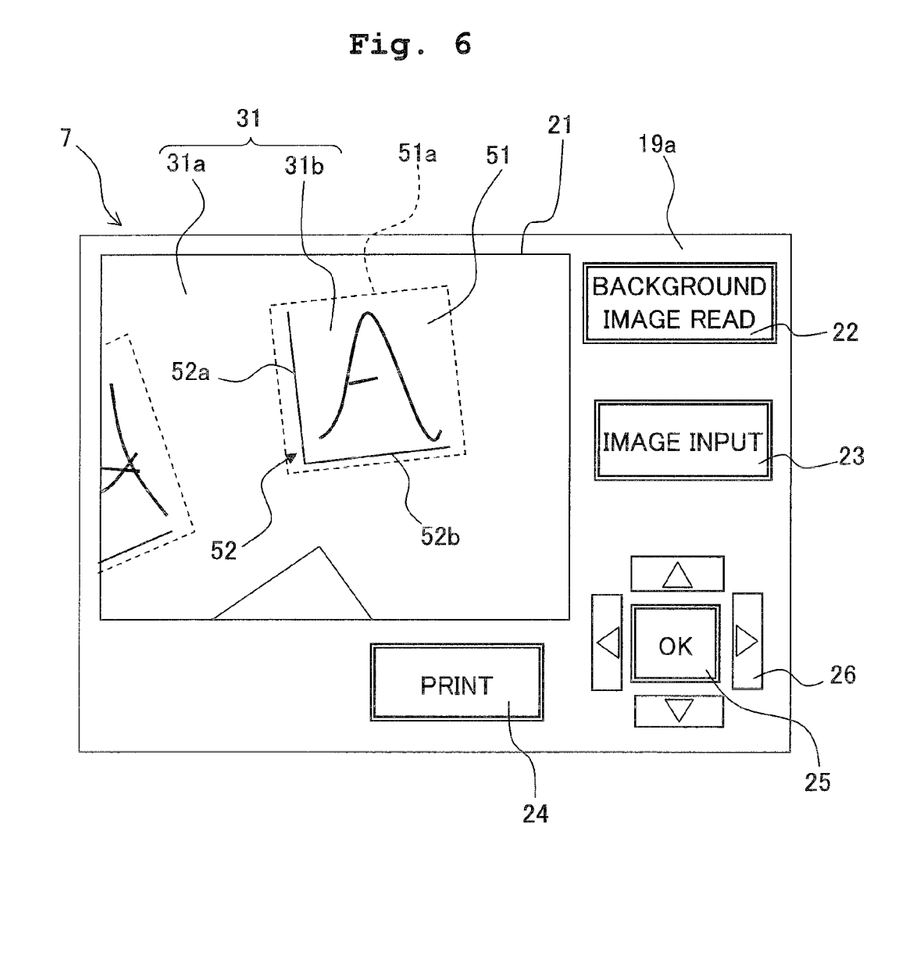
FIG. 6 is a view in a modified example 2 corresponding to FIG. 4C.

In another modified example (a modified example 2), even in the case when the up and down direction of the input region 51 inclines relative to the up and down direction of the display screen 19a, an enlarged image of a portion, of the background image 31a, including the input region 51 is not rotated to be displayed as shown in FIG. 6. That is, at this time, as the data of the display image, the display image data generating section 45 generates image data of the enlarged image in which the input region 51 is not rotated.

In the above case as well, since the user can input the input image 31b while the enlarged image of the portion, of the background image 31a, including the input region 51 is displayed, the input of the input image 31b is facilitated.

Further, the above-descried embodiment is constituted in a manner that the markers 52 in a substantially L shape, which are to be drawn in designating the input regions 51, are continued to be displayed as they are, thereby making the up and down directions of the input regions 51 understandable. However, the present invention is not limited to the above, and other marks in order to make a user recognize the up and down directions of the input regions 51 may also be displayed after the input regions 51 are designated. Incidentally, the marks are not limited to the ones directly showing the up and down directions of the input regions 51 but the marks may also be ones enabling a user to recognize the up and down directions of the input regions 51 indirectly, which are, for example, ones showing the right and left directions of the input regions 51 or the like. Alternatively, the marks in order to make a user recognize the up and down directions of the input regions 51 do not also have to be displayed.

Further, in the above-described embodiment, the input region 51 is designated by drawing the marker 52 in a substantially L shape on the print image display portion 21. However, the present invention is not limited to the above, and the input region 51 may also be designated by another method such as directly drawing a rectangular to be the frame 51a of the input region 51 on the print image display portion 21 or designating a range of the input region 51 by operating the direction buttons 26.

Further, the above-described embodiment is constituted to be capable of changing the position, the size, and the direction (up and down direction) of the input region 51 together with the position, the size, the direction (up and down direction) of the input image 31b that has already been inputted after all the input images 31b are inputted. However, only one of these may also be changeable. Alternatively, the above-described embodiment may also be constituted to be incapable of changing the input regions 51 after the input images 31b are inputted.

Further, in the above-described embodiment, a user designates the input regions 51 while the entire background image 31a is displayed on the print image display portion 21. However, the present invention is not limited to the above, and the input regions 51 may also be designated while not the entire background image 31a but a somewhat wide range thereof, which is, for example, half of the background image 31a, is displayed.

In the above case as well, a user can designate the input regions 51 while a somewhat wide range of the background image 31a is displayed. Thus, it is easy to comprehend the positions, the sizes, the directions, and so on of the input regions 51 with respect to the above range when designating the input regions 51, resulting that it is possible to input images in desired regions of the background image 31a.

In the above-described embodiment, when the user draws the marker 52 in a substantially L shape directly on the print image display portion 21, the rectangular region surrounded by the frame 51a is designated as the input region 51. However, the present invention is not limited to the above. For example, data of a plurality of frames 51a having different sizes respectively may be stored previously in the ROM. When the user selects a frame 51a among the frames 51a and designates a position at which the frame 51a is set on the background image 31a, the region surrounded by the frame 51a may be designated as the input region 51. Further, with respect to the input image 31b, data such as image data or data of character font may be stored previously in the ROM, and the user may select, from these data, the input image 31b to be inputted in the input region 51.

Further, in the foregoing, an example in which the present invention is applied to an ink-jet printer having what is called a serial head is explained, but the present invention is not limited to the above. It is also possible to apply the present invention to a printing apparatus such as an ink-jet printer having what is called a line head or a laser printer.

Furthermore, it is also possible to apply the present invention to an apparatus provided with a touch panel, such as, for example, a small-sized PC, a mobile telephone, or a portable type video game console, to be a composite image data generating apparatus generating image data of a composite image which is obtained after an input image is directly drawn on a display screen on which a background image is displayed and the background image and the input image are synthesized.

What is claimed is:

1. A printing apparatus which prints a composite image formed of a background image and input images on a recording medium, the apparatus comprising:
   a display;
   a detecting sensor configured to detect positions on the display;
   a printing mechanism; and
   a control device configured to:
      control the display to display the background image;
      determine a plurality of input regions, each input region being configured to have an input image inputted therein, the plurality of input regions being displayed simultaneously on the background image displayed on the display;
   for each region, sequentially:
      generate data of an enlarged image comprising an enlargement of: one input region which is included in the plurality of input regions, a part of another input region which is different from the one input region and which is included in the plurality of input regions, and a portion of the background image different from a portion of the background image in another enlarged image;
      control the display to display, in a predetermined area of the display, the enlarged image based on the data of the enlarged image; and
      control the detecting sensor to capture an input image inputted in the one input region included in the enlarged image displayed on the display based on a position detected by the detecting sensor;
   generate data of the composite image from data of the background image and data of the captured input image, the composite image not being an enlarged image; and
   control the printing mechanism to print the composite image on the recording medium based on the generated data of the composite image,
   wherein the input image captured by the detecting sensor is an image drawn by a user directly on the display in the one input region included in the enlarged image.

2. A printing apparatus which prints a composite image formed of a background image and input images on a recording medium, the apparatus comprising:
   a display;
   a detecting sensor configured to detect positions on the display;
   a printing mechanism; and
   a control device configured to:
      control the display to display the background image;
      determine a plurality of input regions and a rotation amount of each of enlarged images to be displayed on the display, each input region being configured to have an input image inputted therein, the plurality of input regions being displayed simultaneously on the background image displayed on the display;
   for each region, sequentially:
      generate data of an enlarged image comprising an enlargement of: one input region which is included in the plurality of input regions, a part of another input region which is different from the one input region and which is included in the plurality of input regions, and a portion of the background image corresponding to the at least one input region, the portion of the background image being different from a portion of the background image in another enlarged image;
      control the display to display, in a predetermined area of the display, the enlarged image based on the data of the enlarged image; and
      control the detecting sensor to capture an input image inputted in the one input region which is included in the enlarged image displayed on the display based on a position detected by the detecting sensor;
   generate data of the composite image from data of the background image and data of the captured input image, the composite image not being an enlarged image; and
   control the printing mechanism to print the composite image on the recording medium based on the generated data of the composite image,
   wherein the input image captured by the detecting sensor is an image drawn by a user directly on the display in the one input region included in the enlarged image,
   the one input region is a region extending in a first and second directions, and
   when the first direction is at an angle relative to a vertical direction of the display, the control device is configured to generate the data of the enlarged image, which is rotated so that the first direction coincides with the vertical direction of the display, based on the determined rotation amount, as the data of the display image.

3. The printing apparatus according to claim 2, wherein the control device is configured to generate data of an image to which a mark indicating the first direction of the input region is added as the data of the enlarged image.

4. The printing apparatus according to claim 2, wherein the control device is further configured to change at least one of a position, a size, and the first direction of the at least one input region together with the input image which is inputted in the input region.

5. The printing apparatus according to claim 2, wherein the control device is further configured to determine positions of the plurality of input regions on the display and the rotation amount of each of the enlarged images by accepting inputs of a plurality of markers indicating the positions of the plurality of input regions, and each of the markers indicates the first direction and the second direction of one of the input regions.

6. A composite image data generating apparatus which generates data of a composite image formed of a background image and input images, the apparatus comprising:
    a display;
    a detecting sensor configured to detect positions on the display; and
    a control device configured to:
        control the display to display the background image;
        determine a plurality of input regions, each input region being configured to have an input image inputted therein, the plurality of input regions being displayed simultaneously on the background image displayed on the display;
        for each region, sequentially:
            generate data of an enlarged image comprising an enlargement of: one input region which is included in the plurality of input regions, a part of another input region which is different from the one input region and which is included in the plurality of input regions, and a portion of the background image different from a portion of the background image in another enlarged image;
            control the display to display, in a predetermined area of the display, the enlarged image based on the data of the enlarged image; and
            control the detecting sensor to capture an input image inputted in the one input region which is included in the enlarged image displayed on the display based on a position detected by the detecting sensor; and
        generate data of the composite image from data of the background image and data of the captured input image, the composite image not being an enlarged image,
    wherein the input image captured by the detecting sensor is an image drawn by a user directly on the display in the one input region in the enlarged image.

7. A computer readable storage device storing a composite image data generating program of instructions executable by a composite image data generating apparatus which has a display and which generates data of a composite image formed of a background image and input images, the program comprising:
    a background image display step for displaying the background image on the display;
    an input region determining step for determining a plurality of input regions, each input region being configured to have an input image inputted therein, the plurality of input regions being displayed simultaneously on the background image displayed on the display;
    for each region, sequentially:
        an enlarged image data generating step for generating data of an enlarged image comprising an enlargement of: one input region, which is included in the plurality of input regions, determined in the input region determining step, a part of another input region which is different from the one input region and which is included in the plurality of input regions, and a portion of the background image different from a portion of the background image in another enlarged image;
        an enlarged image display step for displaying the enlarged image on the display, in a predetermined area of the display, based on the data of the enlarged image generated in the enlarged image data generating step; and
        an image capturing step for capturing an image inputted in the one input region which is included in the enlarged image displayed in the enlarged image display step; and
    a composite image data generating step for generating data of the composite image from data of the background image and data of the input image captured in the image capturing step, the composite image not being an enlarged image,
    wherein the input image captured in the image capturing step is an image drawn directly on the display in the one input region included in the enlarged image.

8. A composite image data generating apparatus which generates data of a composite image formed of a background image and input images, the apparatus comprising:
    a display;
    a detecting sensor configured to detect positions on the display; and
    a control device configured to:
        control the display to display the background image;
        determine a plurality of input regions and a rotation amount of each of enlarged images to be displayed on the display, each input region being configured to have an input image inputted therein, the plurality of input regions being displayed simultaneously on the background image displayed on the display;
        for each region, sequentially:
            generate data of an enlarged image comprising an enlargement of: one input region which is included in the plurality of input regions, a part of another input region which is different from the one input region and which is included in the plurality of input regions, and a portion of the background image corresponding to the one input region, the portion of the background image being different from a portion of the background image in another enlarged image;
            control the display to display, in a predetermined area of the display, the enlarged image based on the data of the enlarged image; and
            control the detecting sensor to capture an input image inputted in the one input region which is included in the enlarged image displayed on the display based on a position detected by the detecting sensor; and
        generate data of the composite image from data of the background image and data of the captured input image, the composite image not being an enlarged image,
    wherein the input image captured by the detecting sensor is an image drawn by a user directly on the display in the one input region included in the enlarged image, the one input region is a region extending in a first and second directions, and when the first direction is at an angle relative to a vertical direction of the display, the control device is configured to generate the data of the enlarged image, which is rotated so that the first direction coincides with the vertical direction of the display, based on the determined rotation amount.

9. The composite image data generating apparatus according to claim 8, wherein the control device is further configured to determine positions of the plurality of input regions on the display and the rotation amount of each of the enlarged images by accepting inputs of a plurality of markers indicating the positions of the plurality of input regions, and each of the markers indicates the first direction and the second direction of one of the input regions.

10. A computer readable storage device storing a composite image data generating program of instructions executable by a composite image data generating apparatus which has a display and which generates data of a composite image formed of a background image and input images, the program comprising:

a background image display step for displaying the background image on the display;

an input region determining step for determining a plurality of input regions and a rotation amount of each of enlarged images to be displayed on the display, each input region being configured to have an input image inputted therein, the plurality of input regions being displayed simultaneously on the background image displayed on the display;

for each region, sequentially:

an enlarged image data generating step for generating data of an enlarged image comprising an enlargement of: one input region, which is included in the plurality of input regions, determined in the input region determining step, a part of another input region which is different from the one input region and which is included in the plurality of input regions, and a portion of the background image corresponding to the one input region, the portion of the background image being different from a portion of the background image in another enlarged image;

an enlarged image display step for displaying the enlarged image on the display, in a predetermined area of the display, based on the data of the enlarged image generated in the enlarged image data generating step; and an image capturing step for capturing an image inputted in the one input region which is included in the enlarged image displayed in the enlarged image display step; and a composite image data generating step for generating data of the composite image from data of the background image and data of the input image captured in the image capturing step, the composite image not being an enlarged image, wherein the input image captured in the image capturing step is an image drawn by a user directly on the display in the one input region included in the enlarged image, the one input region is a region extending in a first and second directions, and when the first direction is at an angle relative to a vertical direction of the display, the data of the enlarged image is generated so that the enlarged image is rotated and the first direction coincides with the vertical direction of the display, based on the determined rotation amount.

11. The computer readable storage device according to claim 10, wherein the program further comprises a step for determining positions of the plurality of input regions on the display and the rotation amount of each of the enlarged images by accepting inputs of a plurality of markers indicating the positions of the plurality of input regions, wherein each of the markers indicates the first direction and the second direction of one of the input regions.

\* \* \* \* \*